US006959953B2

(12) United States Patent
Graffin

(10) Patent No.: US 6,959,953 B2
(45) Date of Patent: Nov. 1, 2005

(54) GRIPPING DEVICE FOR TAKING HOLD OF RECEPTACLES

(75) Inventor: André Graffin, Kuala Lumpur (MY)

(73) Assignee: Serac Group, La Ferte Bernard (FR)

( * ) Notice: Subject to any disclaimer, the term of this patent is extended or adjusted under 35 U.S.C. 154(b) by 227 days.

(21) Appl. No.: 10/413,391

(22) Filed: Apr. 15, 2003

(65) Prior Publication Data

US 2003/0197391 A1 Oct. 23, 2003

(30) Foreign Application Priority Data

Apr. 22, 2002 (FR) ............................................ 02 04986

(51) Int. Cl.[7] ................................................ B65G 47/86

(52) U.S. Cl. .................... 294/104; 294/116; 198/803.9; 198/470.1

(58) Field of Search ................................ 294/104, 116; 198/867.07, 803.3, 803.9, 470.1

(56) References Cited

U.S. PATENT DOCUMENTS 4,473,147 A * 9/1984 Bouwman ................ 198/750.5
4,651,879 A * 3/1987 Harris et al. ................ 209/523
5,743,377 A * 4/1998 Kronseder ............... 198/803.9
6,302,172 B1 10/2001 De Villele
6,692,050 B2 * 2/2004 Graffin ....................... 294/104

FOREIGN PATENT DOCUMENTS

| | | |
|---|---|---|
| DE | 296 02 798 | 10/1996 |
| DE | 198 16 239 | 10/1999 |
| EP | 00005402 | 11/1979 |
| GB | 2318779 | 5/1998 |

* cited by examiner

*Primary Examiner*—Dean J. Kramer
(74) *Attorney, Agent, or Firm*—Young & Thompson

(57) ABSTRACT

The gripping device for taking hold of receptacles comprises tongs having a first jaw fixed to a rotary platform and a second jaw mounted to pivot relative to the first jaw and provided with a control arm, and a locking member mounted to pivot eccentrically about an axis constrained to move with the rotary platform to act on the control arm of the second jaw, the locking member being provided with a drive member disposed to come to face an opening actuating member and a closing actuating member, which members are carried by a stationary frame element.

9 Claims, 1 Drawing Sheet

GRIPPING DEVICE FOR TAKING HOLD OF RECEPTACLES

The present invention relates a gripping device for taking hold of receptacles, particularly, but not exclusively for taking hold of receptacles at a station for screwing on caps.

BACKGROUND OF THE INVENTION

Numerous devices are known for taking hold of receptacles installed on packaging machines. In most cases, it is possible to use gripping tongs whose jaws are urged resiliently towards a closed position, the receptacles being inserted into or extracted from the tongs by means of guide ramps that are suitably disposed adjacent to the zone in which the receptacles are inserted or extracted. Such tongs are commonly used to hold a receptacle vertically under a filling spout or a heat-sealing head for affixing a heat-sealed closure film.

However, for a station at which caps are screwed on, it is necessary not only to hold the receptacle vertically under the cap-screwing head but also to hold it so as to prevent it from turning while tightening torque is being applied to the cap. In existing devices, an element provided with spikes is generally provided, the spikes being disposed to penetrate into the material forming the receptacle when it is inserted into the cap-screwing station. Those devices suffer from the drawback of locally damaging the receptacles. In addition, inserting and extracting the receptacles gradually causes the spikes to wear so that, after a certain number of operating cycles, it is necessary to change the spike-carrying locking member so that it continues to perform its locking function for preventing the receptacles from turning.

OBJECTS AND SUMMARY OF THE INVENTION

An object of the invention is to propose a gripping device for taking hold of receptacles that does not suffer from those drawbacks.

To this end, the invention proposes a gripping device for taking hold of receptacles, said device comprising tongs having a first jaw fixed to a rotary platform and a second jaw mounted to pivot relative to the first jaw and provided with a control arm, and a locking member mounted to pivot eccentrically about an axis constrained to move with the rotary platform to act on the control arm of the second jaw, said locking member being provided with a drive member disposed to come to face an opening actuating member and a closing actuating member, which members are carried by a stationary frame element.

Thus, the stationary jaw serves as a positioning reference for positioning the receptacle, and the shape and the position of the locking member determine the degree of tightening of the jaws of the tongs when said tongs are closed, so that it is possible to exert on the receptacle exactly the pressure that is necessary to prevent it from rotating, without however there being any risk of damaging the receptacle.

In an advantageous version of the invention, the second jaw and the locking member are carried by the first jaw. The gripping device can thus be adapted to various receptacles by changing the tongs in a single tong removal and replacement operation.

In another advantageous aspect of the invention, the drive member of the locking member and the closing actuating member are disposed so that, when the jaws are in the closed position, the locking member is angularly positioned so that a point of greatest eccentricity on the locking member is in contact with a roller carried by the control arm of the second jaw. The tongs are thus locked in irreversible manner, i.e. any force exerted by the receptacle in the opening direction has no effect on the position of the jaws.

BRIEF DESCRIPTION OF THE DRAWING

Other characteristics and advantages of the invention appear on reading the following description of a particular non-limiting embodiment of the invention, with reference to the accompanying drawing, in which.

MORE DETAILED DESCRIPTION

Figure 1:
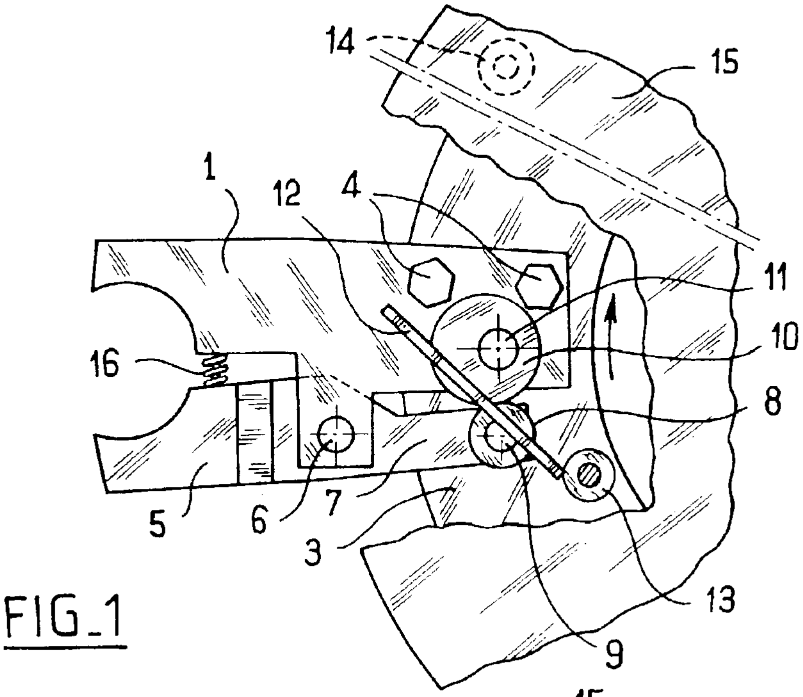
FIG. 1 is a plan view of the gripping device of the invention when the tongs are in the open position.
Figure 2:
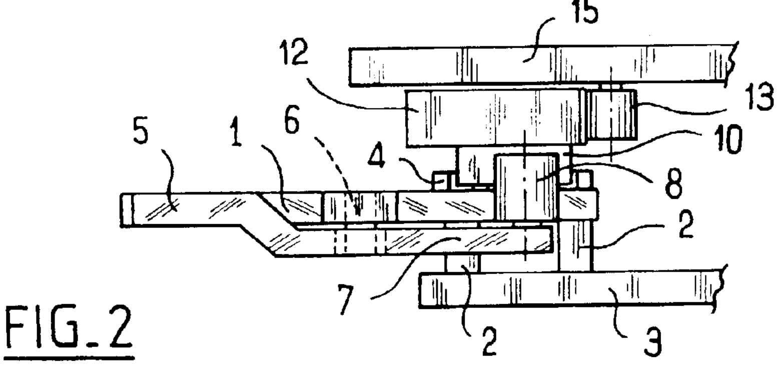
FIG. 2 is a side view of the gripping device of the invention.

With reference to the figures, the receptacle-gripping device of the invention comprises tongs having a first jaw 1 mounted rigidly on studs 2 fixed to a rotary platform 3 by bolts 4. A second jaw 5 is carried by the first jaw 1 and is mounted to pivot relative to said first jaw about an axis 6. The second jaw 5 has a control arm 7 on which a control roller 8 is fixed that is mounted to pivot about an axis 9, e.g. by means of a needle bearing in order to withstand large compression forces.

The control roller 8 extends facing a locking member which, in the embodiment shown, is formed by a circular cam 10 mounted to pivot eccentrically about the axis 11 of a pin carried by the first jaw 1. The locking member is provided with a drive member formed, in this example, by a plate 12 fixed to the cam 10 in a manner offset relative to the axis 11 about which the cam 10 pivots. The drive member 12 is also disposed so that it comes alternately to face an opening actuating roller 13 and to face a closing actuating roller 14, which rollers are fixed under a plate 15 forming a stationary frame element of the gripping device.

In the embodiment described, the actuating members 13 and 14 are disposed on either side of the path followed by the cam 10 as the platform 3 rotates.

The jaws 1 and 5 are returned to the open position by a spring 16 disposed between the jaws, thereby also holding the control roller 8 of the control arm 7 in abutment against the locking cam 10.

Figure 3:
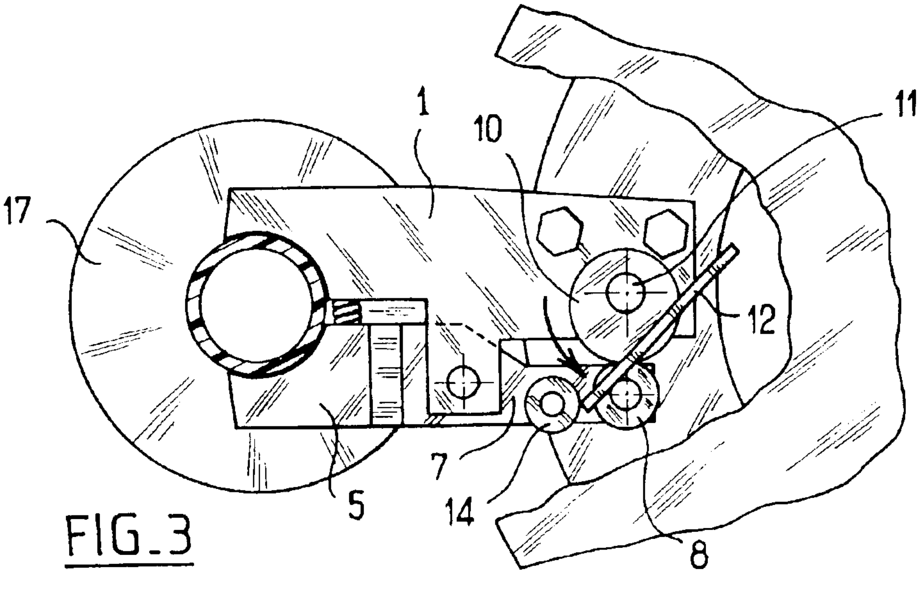
FIG. 3 is a plan view analogous to the view of FIG. 1, when the tongs are in the closed position.

In the preferred embodiment of the invention, the drive member 12 and the opening actuating member 13 are disposed so that, when the drive member 12 comes to face the actuating member 13, as shown in FIG. 1, the locking cam 10 is angularly positioned with its point of greatest eccentricity extending in a direction perpendicular to a plane containing the axis 11 about which the cam 10 pivots, and the axis 9 about which the roller 8 pivots. In this position, a receptacle 17 can be inserted between the jaws 1 and 5 just before the drive member 12 comes to face the closing actuating member 14. When the drive member 12 abuts against the closing actuating member 14, the drive member 12 pivots and causes the locking cam 10 to pivot through one fourth of a turn, as shown in FIG. 3 so that the point of greatest eccentricity of the cam 10 is in contact with the roller 8 carried by the control arm 7. In this position, the reaction force applied by the roller 8 against the locking cam 10 due to the jaws tightening on the receptacle 17 passes through the axis 11 of the locking cam 10 and there is no risk of it causing the locking cam 10 to pivot in the direction in which the jaws are unlocked. The jaws are therefore locked in irreversible manner.

Naturally, the invention is not limited to the embodiment described, and variant embodiments are possible without going beyond the ambit of the invention as defined by the claims.

In particular, although the invention is illustrated by an embodiment in which the second jaw 5 and the locking member 10 are carried by the first jaw, which makes it possible to change the tongs completely in a single tong removal and replacement operation, it is possible to implement the invention by mounting the second jaw 5 and the locking member 10 separately and directly on the rotary platform 3.

Although the invention is described with reference to a locking member in the form of a circular cam and with the drive member and the actuating members being disposed so that the cam pivots through one fourth of a turn between jaw opening and jaw closure, thereby making it possible, by means of a low-cost structure, to move the jaws quickly and accurately and to achieve irreversible locking, it is possible to implement the invention with a cam of a more complex shape, e.g. an ovoid cam, or to use any other locking member having an eccentric structure, e.g. a finger carried by a lever and engaged in a slot in the control arm.

What is claimed is:

1. A gripping device for taking hold of receptacles, said device comprising tongs having a first jaw secured in a stationary position relative to a rotary platform and a second jaw mounted to pivot relative to the first jaw and provided with a control an, and a locking member mounted to pivot eccentrically about an axis constrained to move with the rotary platform to act on the control arm of the second jaw, said locking member being provided with a drive member disposed to come to face an opening actuating member and a closing actuating member, which members are carried by a stationary frame element.

2. A device according to claim 1, wherein the second jaw and the locking member are carried by the first jaw.

3. A device according to claim 1, wherein the drive member and the closing actuating member are disposed so that, when the jaws are in the closed position, the locking member is angularly positioned so that a point of greatest eccentricity on the locking member is in contact with a roller carried by the control arm.

4. A device according to claim 1, wherein the locking member is a cam acting on a rotary roller carried by the control arm of the second jaw.

5. A device according to claim 4, wherein the cam is circular.

6. A device according to claim 5, wherein the drive member and the actuating members are disposed so that the cam pivots through one fourth of a turn between jaw opening and jaw closure.

7. A gripping device for taking hold of receptacles, said device comprising tongs having a first jaw fixed to a rotary platform and a second jaw mounted to pivot relative to the first jaw and provided with a control arm, and a locking member mounted to pivot eccentrically about an axis constrained to move with the rotary platform to act on the control arm of the second jaw, said locking member being provided with a drive member disposed to come to face an opening actuating member and a closing actuating member, which members are carried by a stationary frame element, wherein the second jaw and the locking member are carried by the first jaw.

8. A gripping device for taking hold of receptacles, said device comprising tongs having a first jaw fixed to a rotary platform and a second jaw mounted to pivot relative to the first jaw and provided with a control an, and a locking member mounted to pivot eccentrically about an axis constrained to move with the rotary platform to act on the control arm of the second jaw, said locking member being provided with a drive member disposed to come to face an opening actuating member and a closing actuating member, which members are carried by a stationary frame element, wherein the second jaw and the locking member are carried by the first jaw, wherein the locking member is a cam acting on a rotary roller carried by the control arm of the second jaw, and the cam is circular.

9. A device according to claim 8, wherein the drive member and the actuating members are disposed so that the cam pivots through one fourth of a turn between jaw opening and jaw closure.

* * * * *